July 13, 1926.

E. H. BRISTOL

PRESSURE GAUGE

Original Filed June 13, 1917

1,592,415

Inventor:
Edgar H. Bristol,

Patented July 13, 1926.

1,592,415

UNITED STATES PATENT OFFICE.

EDGAR H. BRISTOL, OF FOXBORO, MASSACHUSETTS, ASSIGNOR TO THE FOXBORO COMPANY, OF FOXBORO, MASSACHUSETTS, A CORPORATION OF MASSACHUSETTS.

PRESSURE GAUGE.

Application filed June 13, 1917, Serial No. 174,509. Renewed January 10, 1924.

This invention relates to gauges and in its more specific aspects to a pressure gauge of the type which measures pressures through the fluctuations of a body of liquid such, for example, as mercury.

My invention will best be understood by reference to the following description of an illustrative embodiment thereof, taken in connection with the accompanying drawings, wherein,—

Figure 1:
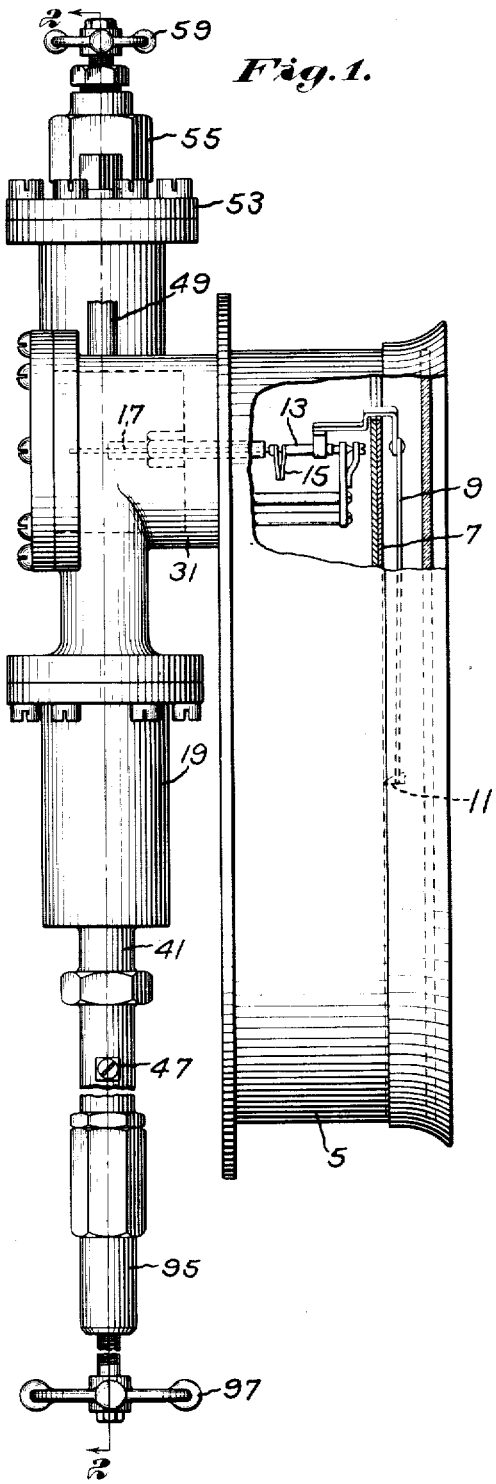
Fig. 1 is a side elevation of an instrument embodying my invention partly broken away.

Referring to Fig. 1, the instrument shown comprises a casing 5 containing any usual or customary form of time mechanism (not shown) adapted to rotate the dial 7 over which sweeps the pointer 9 carrying a pen 11 adapted to record on the dial. The pointer 9 is carried by a sleeve 13 which takes motion through the clutch springs 15 from a shaft 17 which is adapted to be rotated by the pressure-responsive mechanism which I shall next describe. The parts so far referred to may be of any usual form and do not in themselves form a part of the present invention.

The instrument illustrated is adapted to record pressure conditions, and in particular the algebraic sum of two different pressures, by the fluctuations of a body of mercury or other fluid which may be disposed in two parallel and confluent columns.

Figure 2:
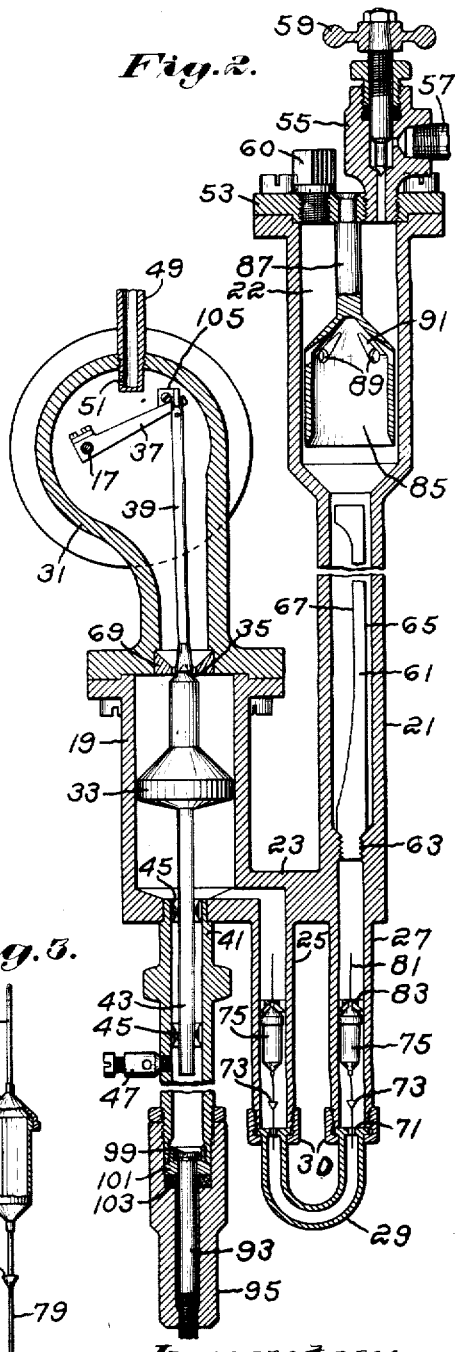
Fig. 2 is a section on the line 2—2 of Fig. 1.

Referring now to Fig. 2, I have herein shown a mercury containing chamber or well 19 at the side of which rises a second chamber or well 21, conveniently longer and of smaller diameter than the well 19 and preferably merging, as shown, into a somewhat larger chamber 22. The two wells are connected by the web 23 which may be formed of a section of tube having a plug welded therein. Communication between them is provided by a conduit preferably of U-shaped form. Herein a depending tube 25 is in communication with the well 19 and a similar depending tube 27 with the well 21. A U-tube 29 connects the lower ends of the tubes 25 and 27 and has terminal flanges secured to the ends of those tubes by couplings 30.

The mercury containing system described may be connected to the casing 5, as shown, by being secured to a housing 31 carried on the back of the casing and surrounding the shaft 17.

The movement of the mercury in the well 19 is communicated to the shaft by means of a float 33 adapted to rise and fall with the mercury column. The float 33 conveniently has the form shown in Fig. 2, and at its upper surface has a conical end portion 35 for a purpose hereafter to be more fully described. The motion of the float is communicated to the shaft 17 by means of a crank 37 carried by the latter, and the link or pitman 39 pivoted to the crank depending therefrom and resting on the float 33. The link 39 preferably has its end formed with a conical recess which fits over the conical end 35 of float 33 and forms therewith a swiveling joint permitting free movement of the float but accurately transmitting vertical movement of the latter to the crank arm 37.

To guide the float and center it in the well I may conveniently adopt the construction illustrated in Fig. 2. I have there shown a tube 41 extending from the bottom of the well 19, and the float 33 has a depending stem 43 which is guided in the tube conveniently by means of collars 45 having thin inner edges to engage the stem with minimum friction and perforated as shown to provide a passage for the mercury. In the side of the tube I show a cock 47 in the form of a small needle valve which permits drawing off an excess of mercury when the instrument is first filled therewith so as properly to adjust the quantity within the same.

The pressures which it is desired to measure are admitted to the two wells 19 and 21 to take effect in opposite senses on the body of liquid held thereby. Herein the higher pressure is admitted to the housing 31 whence it passes through a tube 49 which preferably, as shown, has a blind end and lateral orifices 51, to well 19. These orifices discharge the flow of pressure fluid from the tube against the adjacent curved wall of the housing 31. If by chance any mercury is discharged into the housing it will strike the closed end of the tube 49 but cannot enter the same. To the upper end of the tube which forms the well 21 and chamber 22, which is a continuation thereof, a plate 53 may be secured in which is tapped a fitting 55 having an inlet orifice 57, by which the lower of the pressures to be measured can be admitted to the well under the control of a needle valve 59. An opening 60 provided with a suitable screw plug provides for filling the instrument.

It will be noted that the movement of the float 33 is rectilinear, whereas the movement of the crank arm 37 is an angular movement. To compensate for the inaccuracy of transmission due to this mechanical construction, the effective cross-section of the wells may be varied so that the displacement from one well to the other of a given volume of mercury will effect at different times different variations of level. The corresponding variable movement of the float is arranged to give a regular movement of the crank 37. I herein obtain this effect by inserting in the well 21, which is itself of uniform bore, a member 61 of a cross-section varying along its length which has the effect of varying the effective section of the well. Herein this member 61 is formed of a flat strip or bar having at one end segmental threads permitting it to be secured in the threaded socket 63 at the base of the well. Since the bar is flat the circular opening at the base of the well is not closed. The bar 61 has one straight edge 65 and the opposite edge 67 is cut away along a curve, the form of which is properly determined to effect the desired variation in the movement of the surface of the mercury column in the companion well 19. The form of the edge 67 is in practice determined empirically. A member constructed as described can be conveniently calibrated for a given instrument by planing away the straight edge, so that it forms a very simple and advantageous correcting device.

I shall next describe the mechanism by which the instrument is shielded against sudden excessive pressures and whereby I prevent the controlling fluid from being blown from the wells into other parts of the mechanism. Above the float 33 and conveniently as shown between the housing 31 and the well chamber 19 is provided a member 69 having an orifice or port therein presenting a seat adapted to cooperate with the conical end 35 of the float 33 to cut off communication between the well 19 and the housing 31 when the float is raised to an extreme position somewhat higher than that illustrated in Fig. 2 of the drawings. The link 39 is arranged to extend through the port of the member 69 for support by the float 33. It will thus be seen that if the surface of the mercury in the well 19 suddenly rises to an unusual degree through sudden fluctuation of pressure or otherwise, the float will be seated and prevent the discharge of any mercury into the housing 31 and that the operation of the instrument will temporarily be halted.

Figure 3:
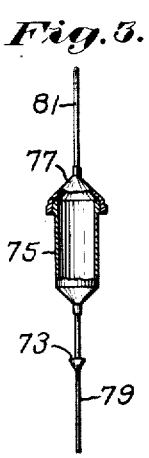
Fig. 3 is a view on a larger scale of one of the buoyed valves, partly broken away.

In conjunction with the mechanism just described, further means are provided for controlling the operation of the device when abnormal pressure is exerted on either column. Herein I have shown the ends of the U-tube 29 as formed with valve seats adapted to cooperate with valves 73 controlled by buoys 75 housed in the legs of the U formed by the tubes 25 and 27. The valves may conveniently take the form shown in Fig. 3, the buoy 75 consisting of a hollow body closed by a cap 77 and having a depending stem 79 carrying the valve proper 73 and another stem 81 adapted to be guided in a perforated collar 83 in the leg of the U. The buoys are normally submerged and the valves 73 are raised from their seats. If the column of mercury sinks on one side so that it no longer holds the buoy in elevated position, the corresponding valve will close and shut all communication between the two wells. Also if the column is subject to sudden fluctuation the buoy will be carried down so as to close the valve and prevent the mercury from blowing out of the instrument at the other side.

The buoy controlled valves are so designed that they are immediately released when the differential of pressure is within the limits for which the instrument is designed. If there is a sudden fluctuation the valves will be swept along in the mercury current and close to prevent blowing of mercury from the instrument, but will immediately be released when the abnormal conditions have terminated and consequently a record will always be made on the chart 7 whenever the differential pressure is within the limits of the chart. It will be understood that once a valve is seated it will be subject directly to the pressures in the two wells and that the buoyancy of the body 75 will act in reinforcement to one of these pressures and in opposition to the other. As long then as the differential is in the opposite sense to and greater than the buoyant effect the valve will remain seated but will lift as soon as the differential falls in value below that effect. The buoys might be said to give the valves a predetermined bias.

When air or other gas enters a column of mercury and escapes through the same, as may happen in an instrument of this character under certain abnormal conditions, a bubble of air is frequently trapped beneath the body of mercury which rises as a unit. To prevent this segregated body or slug of mercury from being blown out of the instrument the well 21 is enlarged in the chamber 22 to afford opportunity for the air bubble to escape and preferably means are provided for breaking up this slug of mercury. I have herein shown a baffle plate member in the form of an inverted cup 85 of the same general cross sectional contour as the chamber 22 but somewhat smaller, suspended therein by means of a stem 87 secured to the cap 53. The cup 85 may have a beveled edge as shown and its bottom is preferably coned, that is, it has its faces disposed at a diagonal as shown. The side walls of the cup adjacent the bottom are provided with lateral openings 89 and herein the conical bottom walls are provided with grooves 91 leading to these openings 89 and thus providing downwardly and outwardly directing passages to the outside of the cup. Herein the inner diameter of the cup is somewhat greater than the diameter of the well 21 so that the cup extends completely over the open top or mouth of that well where it joins the enlarged chamber 22, the cup being spaced as shown a slight distance above such top or mouth. When the slug of mercury rises it is partly broken up by the edges of the cup and further shattered by the bottom thereof and discharged in small particles by the openings 89 and allowed to gravitate back toward the well 21.

When it is desired temporarily to render the mechanism inoperative, for example, when the same is shipped, the well 19 may be isolated from the housing and the body of mercury thereby be completely encased in the chamber provided therefor, this being effected by means of a manual control which I have provided for the valve constituted by the float 33 and the co-operating member 69. Longitudinally adjustable in the tube 41 is a member 93 threaded into the cap 95 which closes the lower end of the tube and movable by a hand wheel 97 (Fig. 1). This member 93 is adapted, when adjusted upwardly from the position shown in Fig. 2, to engage the lower end of the stem 43 and press the float 33 upwardly to seat the same against the member 69, thus effectively sealing the well 19 and, since the float which actuates the pointer 9 is held immovable, rendering the mechanism temporarily inoperative. To close the well 21 the valve 59 is closed.

The end of the member 93 is preferably formed with a head 99 which co-operates with a seat formed in a bushing 101 tightly screwed to the end of tube 41. A packing 103 is placed between the bushing and the cap 95. When the mechanism is put out of operation by screwing up stem 93 the packing will provide against leakage. When the instrument is in use, however, there may be a strong pressure on the joint. The stem is therefore preferably so adjusted that the head 99 will seat on the bushing 101 in the manner of a valve effectually to prevent leakage of mercury.

To prevent strain on the shaft 17 during shipment of the instrument an arm 105 may be secured to the wall of the chamber 70 in housing 31, said arm having a notch adapted to receive the end of the pitman 39 when at its uppermost position and to limit lateral vibration of the pitman and the flexible crank 37.

The operation of the device is as follows. Assuming the parts to be assembled, mercury is poured into the interior of the instrument through the hole which is closed by the plug 60. Any excess mercury may thereafter be removed through the cock 47 until the pointer gives the proper reading. The instrument may then be prepared for shipment by screwing down needle valve 59 and turning hand wheel 97 so that the rod 93 engages stem 43 and presses the float against the seat in member 69.

When the instrument is received, the tube 49 and pipe 57 are connected to sources of pressure, the former being the high pressure and the latter the low pressure side. The valve 59 is opened and the rod 93 screwed down until the enlargement 99 seats, sealing the lower end of tube 41. Fluid under pressure entering the tube 49 is discharged laterally against the wall of housing 31 through openings 51 and tends to depress the column of mercury in well 19 and to cause the float to sink. This tendency is resisted by the pressure of fluid entering through inlet orifice 57 and acting on the column of mercury in well 21. The algebraic sum of the pressures will determine the position of the float and consequently the position of the pointer or hand 9 to which motion is transmitted through link 39 and crank 37. The movement of the fluid for a given vertical distance in the well 21 will cause a varying rise or fall in the well 19, since part of the tube 21 is occupied by the displacement member 61 the size of which varies for different units of its height. This variation is designed to compensate for the action of the transmission mechanism including the crank 37 which would not in itself effect equal movements of the pointer for equal movements of the float.

If the instrument is subjected to abnormal pressure tending to lift the float 33, the valve 35 will seat on the member 69 and prevent discharge of mercury into the housing 31. Also, if there is a sudden fluctuation of pressure or if it rises or falls so as to go beyond the limits of the dial of the instrument, one or the other of the buoyed valves 73 will seat and prevent any more mercury from passing from one well to another. I refer to the paragraph in this specification beginning "The buoy-controlled valves are so designed" for a further description of their action. If a bubble of air is trapped in the mercury and tends to blow out a segregated body or slug of metal from the well 21, it will strike the diagonally disposed walls of the inverted cup 85 and will be broken thereby and disintegrated and directed downwardly through the openings 89 back to the well, while the air bubble escapes.

Having thus described in detail the particular embodiment of my invention shown in the accompanying drawing, the features thereof which I claim as new and desire to secure by Letters Patent I shall express in the following claims:

1. An instrument of the class described comprising a receptacle for a pressure-sensitive fluid column, a float therein, an indicator, and connections therebetween including a depending link having a substantially conical recess, and said float having a projection received in said recess.

2. An instrument of the class described comprising a chamber adapted to receive a pressure-sensitive fluid column, a float therein, there being a port to admit pressure to the column, the margin of which presents a seat, said float having a portion adapted to cooperate with said seat to close the port, a tube opening to the bottom of said chamber, a stem on said float guided in said tube, and a longitudinally adjustable member in said tube having a portion cooperating with said stem to press the float against the seat independently of the fluid column.

3. An instrument of the class described comprising a chamber adapted to receive a pressure-sensitive fluid column, a float therein, there being a port to admit pressure to the column, the margin of which presents a seat, said float having a portion adapted to cooperate with said seat to close the port, a screw-threaded member beneath the float adjustable by rotation and adapted to engage said float to press the same against the seat independently of the fluid column, an indicator and connecting means between said indicator and float including a swivelling joint whereby to permit movement of said float with said member without strain on the connections.

4. An instrument of the class described comprising a chamber adapted to receive a pressure-sensitive fluid column, a float therein, there being a port to admit pressure to the column, said float having a conical portion adapted to enter said port and seat on the margin thereof, an indicating device, and connections between the same and the float including a link having a recess adapted to receive and rest on said conical portion.

5. An instrument of the class described comprising a chamber adapted to receive a pressure-sensitive fluid column, a float therein, there being a port to admit pressure to the column, the margin of which presents a seat, said float having a portion adapted to cooperate with said seat to close the port, an indicating device, and connecting means between the same and the float extending through said port.

6. An instrument of the class described comprising communicating wells for the reception of a fluid, means to admit pressures to said wells, a float in one well, a ported seat above said float which seat is adapted to cooperate with the float to close said well, and a tube opening from the well, said float having a depending stem guided in said tube.

7. An instrument of the class described comprising communicating wells for the reception of a fluid, means to admit pressures to said wells, a float in one well, a ported seat above said float adapted to cooperate therewith to close said well, and a tube opening from the well, said float having a depending stem guided in said tube and a manually adjustable member in said tube having a portion cooperating with said stem to press the float against the seat.

8. An instrument of the class described comprising communicating wells for the reception of a fluid, means to admit pressures to said wells, a float in one well, a ported seat above said float adapted to cooperate therewith to close said well, and a tube opening from the well, said float having a depending stem guided in said tube, an indicator, and connections therefrom comprising a link adapted to extend through the port of said seat and rest on the float.

9. An instrument of the class described comprising communicating wells for the reception of a fluid, means to admit pressures to said wells, a float in one well, a ported seat above said float adapted to cooperate therewith to close said well, and a tube opening from the well, said float having a depending stem guided in said tube, an indicator, and connections between the indicator and float through the port of said seat.

10. An instrument of the class described comprising a chamber adapted to receive a pressure-sensitive fluid column, an indicator, transmission means for controlling said indicator responsively to movement of the column, and a displacement member in said chamber comprising a solid bar having one straight edge and a curved edge providing a varying section and capable of being planed off along said straight edge.

11. In an instrument of the class described a fluid containing well and means for varying the effective section thereof comprising a flat bar having segmental threads at one end and a threaded socket in said well receiving said segmental threads.

12. An instrument of the class described having a well and means for breaking up slugs of fluid in the well, an inverted cup therein having sloping exterior bottom walls and lateral openings adjacent the bottom.

13. An instrument of the class described having a well and means for breaking up slugs of fluid in the well comprising an inverted cup therein having lateral openings adjacent the bottom thereof.

14. An instrument of the class described having a well and means for breaking up slugs of fluid in the well comprising an inverted cup therein having diagonal bottom walls and openings at the base of said walls.

15. An instrument of the class described having a well and means for breaking up slugs of fluid therein comprising an inverted cup in said well having diagonal bottom walls, said walls having grooves opening through the sides of the cup.

16. In an instrument of the class described having a well receiving a liquid column subject to opposed pressures, a baffle member, means for supporting the same above the normal level of the liquid in said well, said member having an extended surface presented transversely thereto to present a shattering barrier to slugs of liquid blown upwardly.

17. In an instrument of the class described having a well receiving a liquid column subject to pressure, a baffle member, means for supporting the same above the normal level of the liquid in said well, said member having an extended surface, presented transversely thereto to present a shattering barrier to slugs of liquid blown upwardly, the upper surface of said member sloping to drain back to the well any liquid driven past the same and dropping on the upper portion thereof.

18. In an instrument of the class described having a well receiving a liquid column subject to pressure and merging at its upper end in an enlarged chamber having a port to admit fluid, a baffle member and means for supporting the same in said chamber above the level of the liquid in the well and above the top of the well, said baffle member extending over the mouth thereof but spaced from the wall of said chamber.

19. In an instrument of the class described, communicating chambers for receiving fluid columns and valve means to shut off the communication between said chambers by the action of abnormal pressure on either column.

20. In an instrument of the class described, chambers for receiving fluid columns a U shaped conduit connecting said chambers, valve seats in said conduit and buoyed valves housed in either leg of the U controlling the communication between said chambers.

21. In an instrument of the class described, chambers for receiving fluid columns having a connecting passage between them, normally submerged buoys for the columns, valves carried thereby and valve seats cooperating with the valves for relatively isolating the chambers on abnormal resultant pressure of either column.

22. In an instrument of the class described, opposed wells to receive fluid columns, an indicating float in one well, a valve seat cooperating with said float to close the chamber when the float is abnormally raised and means to limit fluctuation of said columns in the opposite direction comprising a buoy, a valve carried thereby and a valve seat cooperating with said valve.

23. In an instrument of the class described, opposed wells to receive fluid columns, an indicating float in one well, a valve seat cooperating with said float to close the chamber when the float is abnormally raised and a buoy controlled valve for limiting fluid movement in the opposite direction.

24. A differential pressure instrument having a scale and an index, chambers for confluent fluid columns, means to admit pressures to said columns and oppositely acting valves controlling the communication between said columns and biased to release at predetermined limits of differential pressure corresponding to extremes of said scale.

25. A differential pressure instrument having a scale and an index, chambers for confluent fluid columns, means to admit pressures to said columns and oppositely acting valves controlling the communication between said columns and buoys tending to unseat said valves and designed to correspond to predetermined limits of differential pressure corresponding to extremes of said scale.

26. In an instrument of the class described having chambers to receive confluent fluid columns and means to admit pressures to said columns, means for determining a limit of indication for said instrument comprising a valve to interrupt communication between said columns and a buoy normally tending to unseat the valve.

27. A gauge of the U tube type having a valve seat in one of its legs, a buoyant valve held submerged in the indicating fluid above said seat and adapted to close thereon by action of abnormal pressure.

28. A gauge of the U tube type having a normally open check valve between the legs thereof comprising a valve seat and a normally submerged valve responsive to the velocity action of the indicating fluid under abnormal conditions to be carried thereby to its seat.

29. A gauge of the U tube type having a valve seat in one of its legs, a buoyant valve cooperating with the seat and tending to rise therefrom, said valve being held normally submerged in the indicating fluid.

30. In an instrument of the class described a chamber to receive a pressure sensitive fluid column, a float therein, there being a port to admit pressure to said column the margin of which presents a seat adapted to cooperate with said float, and means for moving said float against said seat including a rod, a valve member on said rod and a seat to cooperate with said member.

31. An instrument of the class described comprising communicating wells for the reception of a fluid, means to admit pressures to the wells, a float in one well, a ported seat above the float adapted to cooperate therewith to close the well, a tube opening from the well, said float having a depending stem guided by said tube, a member entering said tube from the exterior and arranged for adjustment against the stem to seat said float, an enlargement on said member and a seat adapted to cooperate with the enlargement to seal the tube.

32. An instrument of the class described comprising comunicating wells for the reception of a fluid, means to admit pressures to the wells, a float in one well, a ported seat above the float adapted to cooperate therewith to close the well, a tube opening from the well, said float having a depending stem guided by said tube, a bushing at the end of said tube, a rod passing through said bushing, and adjustable against said stem to seat the float, a packing for the rod and an enlargement on the rod adapted to be seated against the bushing inwardly thereof to seal the tube.

In testimony whereof, I have signed my name to this specification.

EDGAR H. BRISTOL.

abnormal conditions to be carried thereby to its seat.

29. A gauge of the U tube type having a valve seat in one of its legs, a buoyant valve cooperating with the seat and tending to rise therefrom, said valve being held normally submerged in the indicating fluid.

30. In an instrument of the class described a chamber to receive a pressure sensitive fluid column, a float therein, there being a port to admit pressure to said column the margin of which presents a seat adapted to cooperate with said float, and means for moving said float against said seat including a rod, a valve member on said rod and a seat to cooperate with said member.

31. An instrument of the class described comprising communicating wells for the reception of a fluid, means to admit pressures to the wells, a float in one well, a ported seat above the float adapted to cooperate therewith to close the well, a tube opening from the well, said float having a depending stem guided by said tube, a member entering said tube from the exterior and arranged for adjustment against the stem to seat said float, an enlargement on said member and a seat adapted to cooperate with the enlargement to seal the tube.

32. An instrument of the class described comprising comunicating wells for the reception of a fluid, means to admit pressures to the wells, a float in one well, a ported seat above the float adapted to cooperate therewith to close the well, a tube opening from the well, said float having a depending stem guided by said tube, a bushing at the end of said tube, a rod passing through said bushing, and adjustable against said stem to seat the float, a packing for the rod and an enlargement on the rod adapted to be seated against the bushing inwardly thereof to seal the tube.

In testimony whereof, I have signed my name to this specification.

EDGAR H. BRISTOL.

Certificate of Correction.

It is hereby certified that in Letters Patent No. 1,592,415, granted July 13, 1926, upon the application of Edgar H. Bristol, of Foxboro, Massachusetts, for an improvement in "Pressure Gauges," an error appears in the printed specification requiring correction as follows: Page 5, line 1, claim 12, after the word "well" strike out the comma and insert instead the word *comprising;* and that the said Letters Patent should be read with this correction therein that the same may conform to the record of the case in the Patent Office.

Signed and sealed this 24th day of August, A. D. 1926.

[SEAL.]

M. J. MOORE,
*Acting Commissioner of Patents.*

Certificate of Correction.

It is hereby certified that in Letters Patent No. 1,592,415, granted July 13, 1926, upon the application of Edgar H. Bristol, of Foxboro, Massachusetts, for an improvement in "Pressure Gauges," an error appears in the printed specification requiring correction as follows: Page 5, line 1, claim 12, after the word "well" strike out the comma and insert instead the word *comprising;* and that the said Letters Patent should be read with this correction therein that the same may conform to the record of the case in the Patent Office.

Signed and sealed this 24th day of August, A. D. 1926.

[SEAL.]

M. J. MOORE,
*Acting Commissioner of Patents.*